(12) United States Patent
Ibanescu

(10) Patent No.: US 9,652,331 B2
(45) Date of Patent: May 16, 2017

(54) TECHNIQUES FOR CREATING A BOOTABLE IMAGE IN A CLOUD-BASED COMPUTING ENVIRONMENT

(71) Applicant: SAS Institute Inc., Cary, NC (US)

(72) Inventor: Mihai Ibanescu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 290 days.

(21) Appl. No.: 14/515,623

(22) Filed: Oct. 16, 2014

(65) Prior Publication Data

US 2015/0120669 A1   Apr. 30, 2015

Related U.S. Application Data

(60) Provisional application No. 61/895,078, filed on Oct. 24, 2013.

(51) Int. Cl.

| | |
|---|---|
| G06F 17/30 | (2006.01) |
| G06F 11/14 | (2006.01) |
| H04L 29/08 | (2006.01) |
| G06F 9/445 | (2006.01) |
| G06F 9/44 | (2006.01) |

(52) U.S. Cl.
CPC ............ G06F 11/1446 (2013.01); G06F 8/61 (2013.01); G06F 9/4401 (2013.01); H04L 67/10 (2013.01); H04L 67/34 (2013.01)

(58) Field of Classification Search
CPC .............. G06F 17/30; G06F 17/30088; G06F 17/30067; G06F 17/00

USPC .................................................. 707/600–899
See application file for complete search history.

(56) References Cited

U.S. PATENT DOCUMENTS

2013/0290542 A1* 10/2013 Watt ........................ H04L 51/22
                                                                   709/226

OTHER PUBLICATIONS

Wral, "SAS expands data, analytics services to Amazon's 'cloud'", http://wraltechwire.com/sas-expands-data-analytics-services-to-amazon-s-cloud-/13885183/, Techwire, Aug. 12, 2014, 2 pages.

* cited by examiner

Primary Examiner — Isaac M Woo

(57) ABSTRACT

Various embodiments are generally directed to an apparatus, method and other techniques for receiving a request to generate a bootable image in a cloud-based computing environment, creating a block storage volume in the cloud-based computing environment in response to receiving the request, the block storage volume having one or more partitions. Further, an apparatus, method and so forth may include installing software comprising one or more files in a file system on the block storage volume in the cloud-based computing environment, creating a snapshot of the file system including the software in the cloud-based computing environment, and creating a bootable image from the snapshot of the file system in the cloud-based computing environment.

21 Claims, 15 Drawing Sheets

700

- RECEIVE A REQUEST FROM A REMOTE COMPUTING DEVICE TO GENERATE A PERSISTENT BOOTABLE IMAGE IN A CLOUD-BASED COMPUTING ENVIRONMENT
  *705*

- CREATE A BLOCK STORAGE VOLUME IN THE CLOUD-BASED COMPUTING ENVIRONMENT IN RESPONSE TO THE REQUEST TO GENERATE THE PERSISTENT BOOTABLE IMAGE, THE BLOCK STORAGE VOLUME HAVING ONE OR MORE PARTITIONS
  *710*

- INSTALL SOFTWARE COMPRISING ONE OR MORE FILES IN A FILE SYSTEM ON THE BLOCK STORAGE VOLUME IN THE CLOUD-BASED COMPUTING ENVIRONMENT, THE SOFTWARE RETRIEVED REMOTELY AS A SOFTWARE ARCHIVE
  *715*

- CREATE A SNAPSHOT OF THE FILE SYSTEM INCLUDING THE SOFTWARE IN THE CLOUD-BASED COMPUTING ENVIRONMENT
  *720*

- CREATE THE PERSISTENT BOOTABLE IMAGE FROM THE SNAPSHOT OF THE FILE SYSTEM IN THE CLOUD-BASED COMPUTING ENVIRONMENT
  *725*

*FIG. 7*

TECHNIQUES FOR CREATING A BOOTABLE IMAGE IN A CLOUD-BASED COMPUTING ENVIRONMENT

RELATED APPLICATION

This application claims the benefit of priority of 35 U.S.C. §119(e) to U.S. Provisional Patent Application Ser. No. 61/895,078, filed on Oct. 24, 2013, which is incorporated by reference in its entirety.

BACKGROUND

Cloud computing is an architecture in which users do not own the physical infrastructure related to applications, data storage, remote processing etc. Instead, users avoid the various expenses associated with operating computers, maintaining large storage centers, maintaining software, etc. by purchasing usage from a third-party cloud system provider. The cloud computing model has become increasingly viable for many enterprises for various reasons, including that the cloud infrastructure may permit information technology resources to be treated as utilities that can be automatically provisioned on demand, while also limiting the cost of services to actual resource consumption. Moreover, consumers of resources provided in cloud computing environments can leverage technologies that might otherwise be unavailable. Thus, as cloud computing and cloud storage become more pervasive, many enterprises will find that moving data and processing to cloud providers can yield economies of scale, among other advantages.

SUMMARY

The following presents a simplified summary in order to provide a basic understanding of some embodiments described herein. This summary is not an extensive overview, and it is not intended to identify key/critical elements or to delineate the scope thereof. One purpose is to present some concepts in a simplified form as a prelude to the more detailed description that is presented later.

For example, various embodiments are generally directed techniques for creating a bootable image in a cloud-based computing environment. In one embodiment, for example, an apparatus may include processing circuitry and an update service component operative on the processing circuitry further including a block storage component, a file system component and an image component. In some embodiments the update service component may receive a request to generate a bootable image in a cloud-based computing environment from a remote computing device. The block storage component operative on the processing circuitry may create a block storage volume having one or more partitions in the cloud-based computing environment in response to receiving the request. The file system component operative on the processing circuitry may install software including one or more files in a file system on the block storage volume in the cloud-based computing environment. Further, the image component operative on the processing circuitry may create a snapshot of the file system including the software in the cloud-based computing environment and create the bootable image based on the snapshot of the file system in the cloud-based computing environment.

To the accomplishment of the foregoing and related ends, certain illustrative aspects are described herein in connection with the following description and the drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

BRIEF DESCRIPTION OF THE DRAWINGS

Embodiments of this disclosure are illustrated by way of example, and not by way of limitation, in the figures of the accompanying drawings in which like reference numerals refer to similar elements.

FIG. 7 illustrates an exemplary embodiment of a second logic flow diagram.

DETAILED DESCRIPTION

Figure 1:
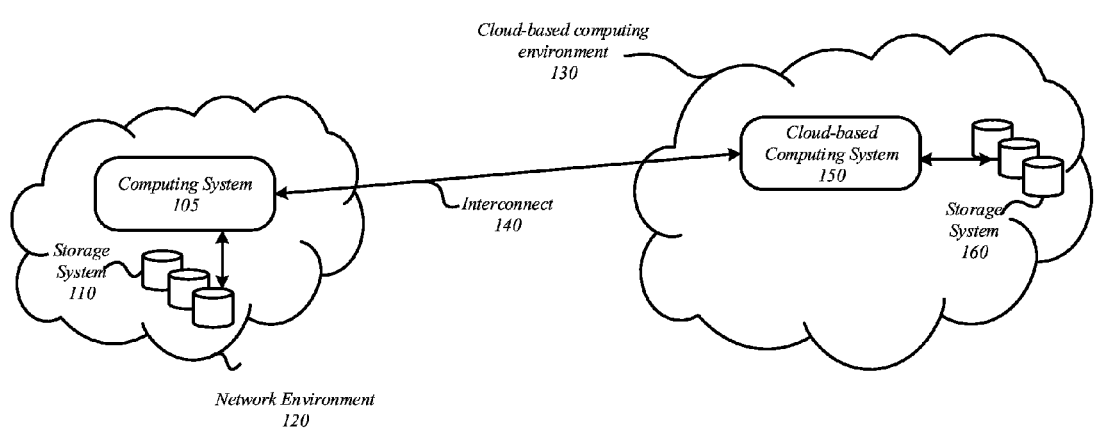
FIG. 1 illustrates an exemplary embodiment of a system.

Generally, embodiments may be directed to the creation of a bootable image on a cloud-based computing system in a cloud-based computing environment via a remote device. In various embodiments, the bootable image may be an Amazon Machine Image® (AMI) and may provide information to launch an instance, or virtual environment in the cloud-based computing environment, such as Amazon's Elastic Compute Cloud® (EC2), for example. Moreover and in some embodiments, the bootable image may be backed by an elastic block storage volume (EBS) provided by Amazon's EC2®. However, various embodiments are not limited in this manner, and are not limited to only the images or environments from Amazon® or a related service.

In various embodiments, the bootable image may be used to create a virtual environment in the cloud-based computing system for one or more remote computing devices of a remote computing system for interaction and operation. The bootable image may provide various services to the remote computing system, such as processing services, storage services, networking services and so forth. Further, the bootable image may be created with software provided by the remote computing system. The software may include operating system files, application files, database files, configuration files and so forth.

The software may be configured and determined by a user or logic on the remote computing system and may provide a virtual environment configured in a manner desired by the user or remote computing system. More specifically, when the bootable image is configured with the software and loaded on the cloud-based computing system, a virtual environment can be created as determined by the user or remote computing system.

The bootable image may be generated by the cloud-based computing system in response to receiving a request to create the image from the remote computing system. In some embodiments, the cloud-based computing system may utilize an update service component to create a block storage volume on storage of the cloud-based computing system. As previously discussed, the block storage volume may be, for example, an EBS volume provided by Amazon's EC2®. The block storage volume may be attached to the update service component and one or more file systems may be installed and mounted on the block storage volume. As will be discussed in more detail below, the file systems may be any type of file system.

The update service component may receive or retrieve the software for installation from the remote computing system and may install it in the file system on the block storage volume. Once the software is installed on the block storage volume, the file system may be unmounted on the volume and the volume may be detached from the update service component. However, various embodiments are not limited in this manner and the volume may remain attached to the update service component.

The update service component may take a snapshot of the block storage volume including the installed software to create a copy of the block storage volume. The snapshot may then be used to create the bootable image on the cloud-based computing system. These and other details will become more apparent with the following description and with reference to the drawings.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is referred to here and is generally conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

FIG. 1 illustrates a general overview of a system 100 for creating bootable images in a cloud-based computing environment. More specifically, FIG. 1 illustrates the system 100 including a network environment 120 having a computing system 105 coupled with storage system 110 and a cloud-based computing environment 130 having a cloud-based computing system 150 coupled with storage system 160. In various embodiments, the computing systems 105 and 150 may represent one or more devices, nodes, components, infrastructure and so forth for processing information and data. Further, the storage systems 110 and 160 may be any type of storage system and include any number of devices, hard disks, memory devices, tape devices, and so forth for storing information and data.

The network environment 120 may be any type of networking environment including a home network, a corporate network, a small or large business network including any type of intranet or extranet, a local area network (LAN), a wireless local area network (WLAN), a wide area network (WAN), a metropolitan area network (MAN), a storage area network (SAN), a server area network, a small area network, a campus area network, a controller area network, a cluster area network, a personal area network (PAN), a desk area network (DAN), a cloud-based network and so forth.

For example, the network environment 120 may be a corporate network including computing system 105 coupled with storage system 110 behind a firewall. The computing system 105 may include any number of client devices, servers, networking devices, nodes, components, infrastructure and so forth. In various embodiments, the devices, servers, nodes, components, etc. may be either collocated or distributed in location.

As similarly discussed above with respect to network environment 120, the cloud-based network environment 130 may be any type of networking environment. In some embodiments, the cloud-based network environment 130 may include the cloud-based computing system 150 having a plurality of distributed devices. The computing resources of the cloud-based computing system 150 may be pooled to serve multiple consumers, with different physical and virtual resources dynamically assigned and reassigned according to consumer demand. Examples of resources include storage, processing, memory, network bandwidth, and virtual machines. In various embodiments, the cloud-based computing environment 130 including the cloud-based computing system 150 may offer persistent storage capabilities to consumers to store data and information. The cloud-based computing system 150 may communicate via any suitable arrangement and protocol. Further, the cloud-based computing system 150 may include servers associated with one or more providers.

In various embodiments, computing system 105 may communicate with cloud-based computing system 150 via interconnect 140 to access the computing resources of cloud-based computing system 150. For example, the computing system 105 may communicate with cloud-based computing system 150 to access storage space, processing capacity, network bandwidth, virtual machines and so forth. Further and as will be discussed in more detail below, the computing system 105 may create and utilize bootable images on the cloud-based computing system 150. The bootable images may allow a user of computing system 105 to load or boot into an environment remotely through an interface such as a web browser, a graphical user interface (GUI), a text-based interface, and so forth. In various embodiments, interconnect 140 may include any number of wired or wireless connections to support communication between computing system 105 and cloud-based computing system 150. Moreover, interconnect 140 may support any type of communication method and protocol to communicate information and data between the systems 105 and 150.

Figure 2A:
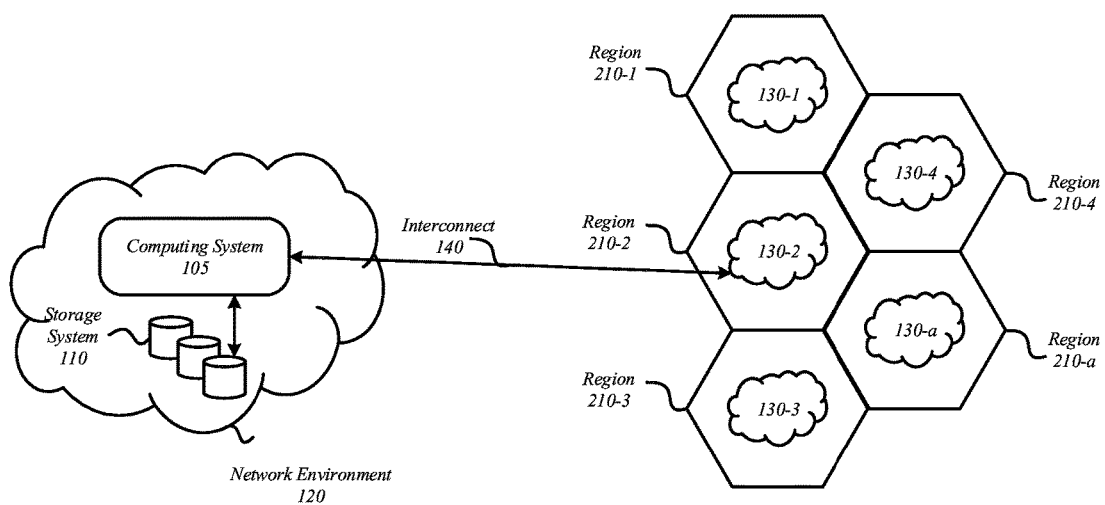
FIGS. 2A/B illustrate exemplary embodiments of a system including regions each having a cloud-based computing system.
Figure 2B:
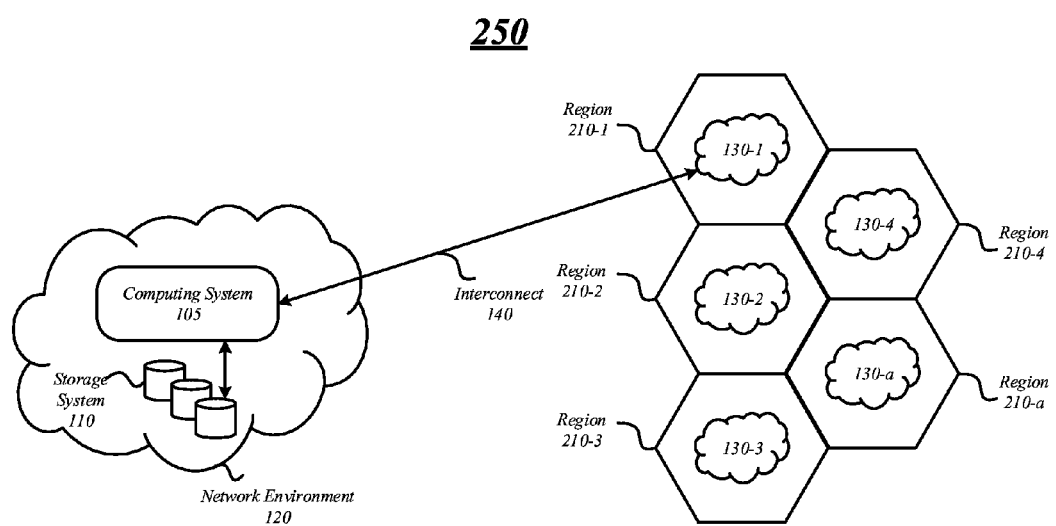

FIGS. 2A/2B illustrate exemplary embodiments of systems 200 and 250. More specifically, FIGS. 2A and 2B illustrate a number of cloud-based computing networks 130 each in a region 210. Each cloud-based computing network 130 may include a cloud-based computing system 150, as previously discussed above with respect to FIG. 1. Further, each region 210 may represent a geographical region based on location. For example, an area such as the United States may be broken up into any number of regions 210 and each region 210 may have a cloud-based computing network 130 to keep devices, equipment and so forth within close proximity of each other. Further, by utilizing a number of regions 210 each having a cloud-based computing network 130, the length of communication paths between devices and equipment may be kept at relatively short distances. The shorter communication paths, using less equipment may generally allow for faster communication of information between the devices. In various embodiments, the regions 210 may be any size and any shape and may be based on distance, population or any other factor.

As previously discussed, computing devices outside of the cloud-based computing networks 130, such as a device of computing system 105 may access the services of a particular cloud-based computing network 130 based on location, performance and so forth. The user or device of computing system 105 may choose a cloud-based computing network 130 based on the location of the network and proximity of its network to the cloud-based computing network 130. For example, FIG. 2A illustrates the computing system 105 communicating with and accessing the cloud-based computing system 150 within cloud-based networking environment 130-2 in region 210-2. A user or device of computing system 105 may choose to access the cloud-based computing system 150 within cloud-based network environment 130-2 because it is the closest cloud-based network environment 130 to the computing system 105. In some embodiments, a user or device may select a particular cloud-based networking environment 130 for reasons other than location, such as performance requirements or services offered.

For example, FIG. 2B illustrates computing system 105 communicating with cloud-based computing system 150 of cloud-based networking environment 130-1 in region 210-1. A user or device may select cloud-based network environment 130-1 based on the services that are provided by the network. More specifically, not all cloud-based networking environments 130 may offer the same services. The user or device may select the cloud-based network environment 130 that includes services that meet its particular requirements. In another example, a user or device may select cloud-based network environment 130-1 based on performance. In some instances, the closest cloud-based computing environment 130 will offer the best performance. However this may not always be the case and a user or device may select another cloud-based networking environment 130 at a further distance that does meet its performance requirements. Various embodiments are not limited in this manner and a user or device may select a cloud-based network environment 130 for any number of reasons.

Figure 3:
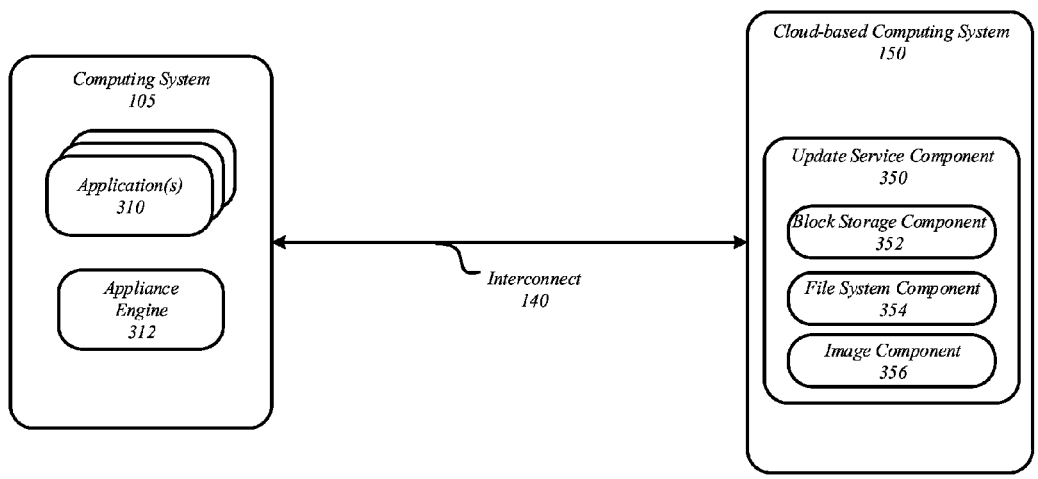
FIG. 3 illustrates an example of a system for creating a bootable image on a cloud-based computing system.

FIG. 3 illustrates an exemplary embodiment of system 300 for creating, accessing and providing bootable images including computing system 105 and cloud-based computing system 150 of FIGS. 1, 2A and 2B. In embodiments, computing system 105 may include one or more applications 310 and an appliance engine 312. Further, cloud-based computing system 150 may include an updated service component 350 having a block storage component 352, a file system component 354 and an image component 356. Although FIG. 3 illustrates computing systems 105 and 150 having a specific number of components, various embodiments may not be limited in this manner and the systems may have any number of components to generate, access and provide bootable images.

As previously discussed, computing system 105 may be part of a networking environment 120, such as a corporate networking environment and may include one or more nodes, devices, components and so forth. Computing system 105 may also include one or more applications 310 which may be any type of application for processing information on computing system 105. In one embodiment, for example, the one or more applications 310 may be implemented as one or more statistical computing programs, such as one or more SAS® software application programs made by SAS Institute Inc., in Cary, N.C. In some embodiments, the one or more applications 310 may operate with and utilize cloud-based services offered by a cloud-based network, such as cloud-based networking environment 130. For example, the one or more applications 310 may interface with the cloud-based networking environment 130 to create and use bootable images via an interface, such as a web browser, GUI, text-based interface, and so forth. Further, the one or more applications 310 may store information and offload processing onto the cloud-based networking environment 130 by creating and using bootable images. The bootable image may be generated from software files and may be used to create a virtual environment for the one or more applications 310 to load and access remotely via the interface. The embodiments, however, are not limited to these examples and although FIG. 3 illustrates only a single application, computing system 105 may have any number of applications on it.

In some embodiments, the computing system 105 may include an appliance engine 312 that is capable of operating the one or more applications 310 in a standalone execution environment. The appliance engine 312 can also control various aspects for the one or more applications 310 to interface and communicate with a cloud-based computing network, such as cloud-based computing network 130 and cloud-based computing system 150. Further, appliance engine 312 may enable the one or more applications 310 to communicate with the cloud-based computing system 150, create bootable images, and manage updates for the one or more applications 310 on the cloud-based computing system 150.

In some embodiments, the appliance engine 312 may be a distributed architecture that can implement the lifecycle of computer systems, such as computing system 105 and manage bootable images for applications, such as one or more applications 310. A user of the appliance engine 312, for example, could have the main software repository running on premise, behind a firewall, along with a database of machines (systems) that have been deployed. Traditionally, the appliance engine 312 may allow one or more applications 310 to be updated by having bootable images directly built on computing system 105. However, in some embodiments, one or more applications 310 may use more resources than available on computing system 105. Thus, the one or more applications 310 utilizing the appliance engine 312 may offload processing and storage to the cloud-based computing system 150. The appliance engine 312 may then update software on the cloud-based computing system 150 by generating and using bootable images.

The appliance engine 312 may send a request to generate a bootable image to the cloud-based computing system 150 in a cloud-based computing environment 130. In some embodiments, a user or the appliance engine 312 may selected which cloud-based computing system 150 to send to by region. More specifically, the appliance engine 312 may determine a region and system based on any number of factors, such as proximity to the region, services provided by the system in the region, performance, and so forth, as similarly discussed above with respect to FIGS. 2A and 2B. The appliance engine 312 may then send the request to the cloud-based computing system 150 in the selected region.

The request to generate the bootable image may be initiated by a user of the computing system 105 or by the appliance engine 312. For example, a user may be configuring one or more applications 310 and may want to offload some services, data, processing and so forth from the computing system 105 to cloud-based computing system 150. In another example, appliance engine 312 may analyze the computing system 105 and determine that it may not be able to meet the application's 310 resource requirements. For example, the one or more applications 310 may require more storage and processing power than the computing system 105 can provide and the appliance engine 312 may utilize the cloud-based computing system 150 to provide these services.

In various embodiments, the appliance engine 312 may also generate a software archive of software files to use when making a bootable image and may provide the software archive to the cloud-based computing system 150 to use when making the image. The software files may include application executable files, operating system files, data files, configuration files, and so forth to support the creation of the bootable image. The appliance engine 312 may make the software archive available for the cloud-based computing system 150 to retrieve from computing system 105 or may send the software archive to the cloud-based computing system 150. For example, and as will be discussed in more detail below, the cloud-based computing system 150 may retrieve the software archive from the computing system 105, un-package the archive and use it to create the bootable image.

As previously discussed, the cloud-based computing system 150 may be part of a cloud-based networking environment 130, such as Amazon's Elastic Compute Cloud® (EC2), for example, and may include a number of components to allow remote devices to access resources such as processing, storage, networking and so forth. In various embodiments, the cloud-based computing system 150 may include an update service component 350 to enable the creation of a bootable image on the cloud-based computing system 150. The update service component 350 may give systems running on a public cloud access to software that may have originated behind a company's firewall. Further, the update service component 350 may include components, such as a block storage component 352, a file system component 354 and an image component 356 to build bootable images directly on the cloud-based computing system 150.

In various embodiments, the update service component 350 may receive a request to create a bootable image on the cloud-based computing system 150 from a remote device, such as one or more devices, nodes, etc. of computing system 105. The update service component 350 may process the request and the block storage component 352 may create a block storage volume on the cloud-based computing system 150 of the cloud-based computing environment 130 in response to receiving the request, the block storage volume may have one or more partitions. In some embodiments, the block storage volume may be an elastic block storage volume (EBS) provided by Amazon's Elastic Compute Cloud® (EC2), for example. However, various embodiments are not limited in this manner and the block storage volume may be any storage volume offered in a cloud-based computing environment.

In various embodiments, the block storage component 352 may create the volume on storage, such as storage system 160 of the cloud-based computing system 150. The block storage volume may be any size, such as 1 Gigabyte (GB), 100 GB, 500 GB, 1 Terabyte (TB), and so forth. In some embodiments, the size of the block storage volume may be limited to a specific size, such as 1 TB, for example. However, various embodiments are not limited in this manner. Further, the size of the block storage volume may be based on default configuration settings, information received in the request to create the image and so forth.

Once created, the block storage volume may then be used like a raw block device. For example, the block storage volume may be divided into any number of partitions and formatted with one or more file systems. In some embodiments, the block storage component 352 may divide the block storage volume into partitions based on default configuration settings, information received in the request, and so forth and may attach the volume to the update service component 350.

The file system component 354 may create and mount a file system on the block storage volume, and more explicitly on one or more partitions of the volume. The file system may be any type file system that may be suitable for the computing system 150 and one or more applications 310. In some embodiments, the file system type may be specified in the request to create the image and determined by a user or the appliance engine 312. By way of example, the file system may be a file allocation table (FAT) file system, an extendable file system (EXT), a boot file system (BFS), an extend file system (EFS), a hierarchical file system (HFS), a high performance file system (HPFS), a fast file system (FFS), a journaling file system (JFS), a macintosh file system (MFS), a new technology file system (NTFS), an OS-9 file system, a ReiserFS, a smart file system (SFS), unix file system (UFS), write anywhere file system (WAFL), or any other file system. Various embodiments are not limited to these examples.

In some embodiments, more than one file system may be installed and mounted on the volume. For example, the block storage volume may be divided into three partitions and the file system component 354 may create a different file system on each of the different partitions. Moreover, the same file system may be installed on multiple partitions. Any combination of file systems and partitions may be created on the block storage volume. In some instances, the file system may be made or identified as a bootable file system by the file system component 354 once it is created on the volume.

The file system component 354 can also mount the created or generated file system on the block storage device and install software including one or more files in the file system. The software may be a software archive retrieved from the computing system 105. The software archive may be decompressed or restored and installed on the file system of the block storage volume. As previously discussed, the software may include application executable files, operating system files, data files, configuration files, and so forth to support the creation of the bootable image and provide a virtual environment for the one or more applications 310.

In various embodiments, the file system may be unmounted from the block storage volume once the software is installed. Unmounting the file system may be similar to a "soft" eject inside the virtual machine to ensure all data and information is properly written to disk. Once a file system is unmounted, it no longer can be accessed by an operating system. The block storage volume can then be detached from the update service component 350 so that a snapshot of the volume and file system may be taken to create the bootable image. In some embodiments, the block storage volume can be detached using specific methods provided by a virtualization environment's programming interface. The block storage volume may be detached from the update service component 350 to allow for the creation of a snapshot without being disturbed by processes running on the cloud-based computing system 150. Alternatively, the volume may remain attached to the update service component 350 to continue the creation of the bootable image on the cloud-based computing system 150. The update service component 350 may include an image component 356 to create a snapshot of the file system including the software in the cloud-based computing environment and/or create the bootable image using the snapshot.

The snapshot, for example, may be a copy of the block storage volume at the time the snapshot is taken and may be used to create the bootable image. The snapshot may contain all of the information needed to create bootable image. In various embodiments, the bootable image may be an Amazon® Machine Image (AMI), for example, and may provide information to launch an instance, or virtual environment in the cloud-based computing environment 130. The bootable image may include the software installed on the block storage volume, for example, an operating system, an application server, applications, configurations settings, data, and so forth.

The computing system 105 may use the newly created bootable image to initiate a virtual machine on the cloud-based computing system 150. In some embodiments, the computing system 105 may use the created bootable image to initiate multiple instances of the virtual machine on the cloud-based computing system 150. Each instance of the virtual machine may provide the same or similar environments for the computing system 150 to interact in and with. Further, various embodiments are not limited to computing system 105 accessing instances of the virtual machine. In some embodiments, other computing systems and devices may initiate and use the virtual machine using the bootable image.

Although the bootable image can be kept in a persistent manner on the cloud-based computing environment 130 each virtual machine may be loaded, unloaded, and reloaded on the cloud-based computing environment 130. For example, the computing system 105 may only require use of the virtual environment at specific times, and may use the bootable image to create the virtual environment on the cloud-based computing environment 130 during those times. Once the computing system 105 is done using the virtual environment, the virtual environment may be shut down or deregistered, e.g. the resources may be returned to the cloud-based computing environment 130 for other processing.

FIGS. 4A-4D illustrate various states of system 400 during the creation of the bootable image. System 400 may include a computing system 105 in network environment 120 and a cloud-based computing system 150 in a cloud-based computing environment 130, as previously discussed with respect to FIGS. 1-3.

Figure 4A:
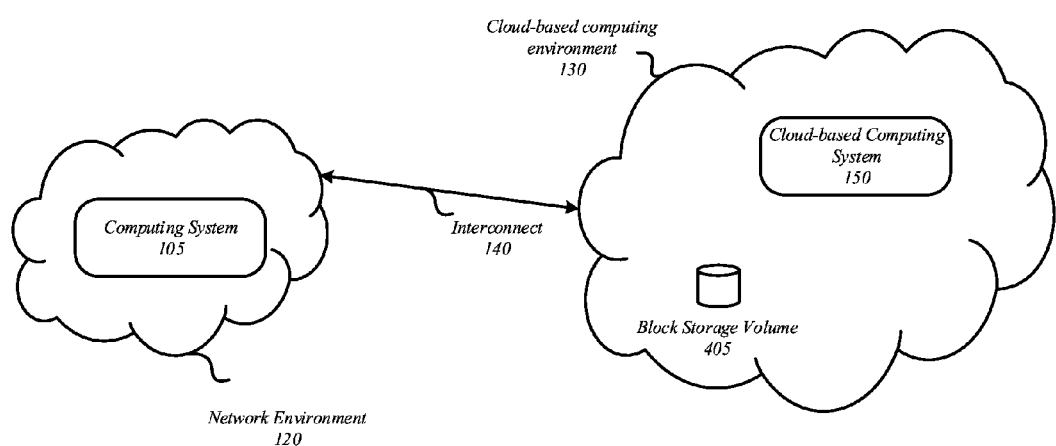
FIGS. 4A-4D illustrate exemplary embodiments of various states of a system during the creation of a bootable image.

The computing system 105 may include an appliance engine 312 to control and initiate the generation of bootable images on the cloud-based computing system 150. The appliance engine 312 may send a request to the cloud-based computing system 150, and in particular, an update service component 350. In response to receiving the request, the update service component 350 may request the creation of a block storage volume 405 in the cloud-based computing environment 130, as illustrated in FIG. 4A. More specifically, the cloud-based computing system 150 may be coupled to a storage system 160, and the update service component 350 may create the volume on the storage system 160 by invoking an application program interface (API) on the cloud-based computing environment 130. In some embodiments, the block storage volume 405 may be an EBS volume provided by Amazon's Elastic Compute Cloud® (EC2), for example. The block storage volume 405 may be any size, such as 1 Gigabyte (GB), 100 GB, 500 GB, 1 Terabyte (TB), and so forth. In some embodiments, the size of the block storage volume 405 may be limited to a specific size, such as 1 TB, for example. However, various embodiments are not limited in this manner. Further, the size of the block storage volume 405 may be based on default configuration settings, information received in the request to create the image and so forth.

Figure 4B:
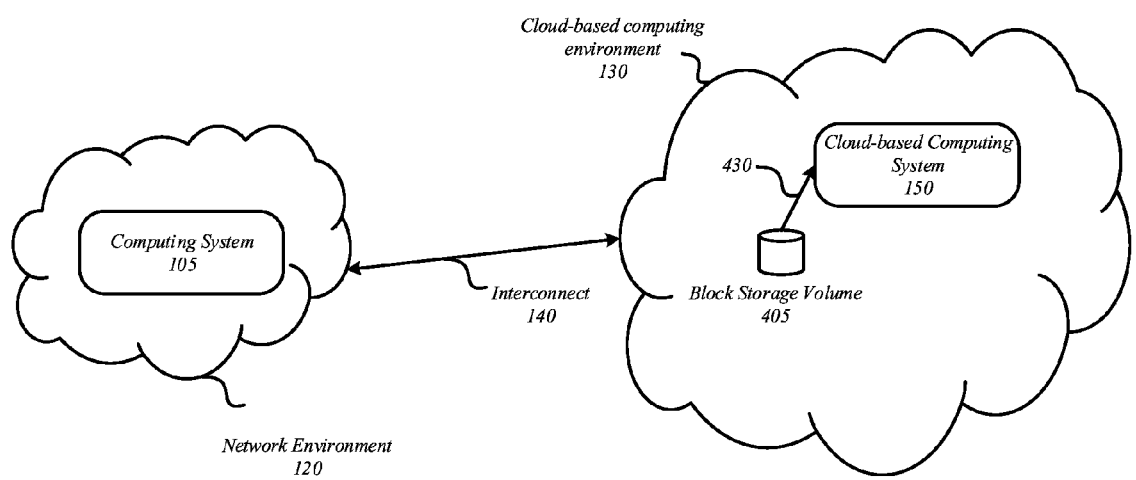

Once created, the block storage volume 405 can then be used like a raw block device. For example, the block storage volume 405 may be divided into any number of partitions and formatted with one or more file systems. The block storage volume 405 may be divided into partitions based on default configuration settings, information received in the request, and so forth, and can attach to the update service component of the cloud-based computing system 150, as illustrated by FIG. 4B at line 430.

While attached to the update service component 350, one or more file systems may be created on the block storage volume 405, and/or more explicitly on one or more partitions of the volume. The file system may be any type file system that may be suitable for the computing system 150 and one or more applications 310. In some embodiments, the file system type may be specified in the request to create the image and determined by a user or the appliance engine 312.

In some embodiments, more than one file system may be installed on the volume 405. For example, the volume 405 may be divided into three partitions and different file systems may be created on each of the different partitions. Moreover, the same file system may be created on multiple partitions. Any combination of file systems and partitions may be created on the block storage volume 405. In some instances, the file system may be made or identified as a bootable file system once it is created on the volume 405.

In addition to creating file systems on the volume 405, software may also be installed while the volume 405 is attached to the update service component 350. The software may include one or more files retrieved as a software archive from a computing system 105. As previously discussed, the software and software archive may include application executable files, operating system files, data files, configuration files, and so forth to support the creation of the bootable image and provide a virtual environment for one or more applications.

Figure 4C:
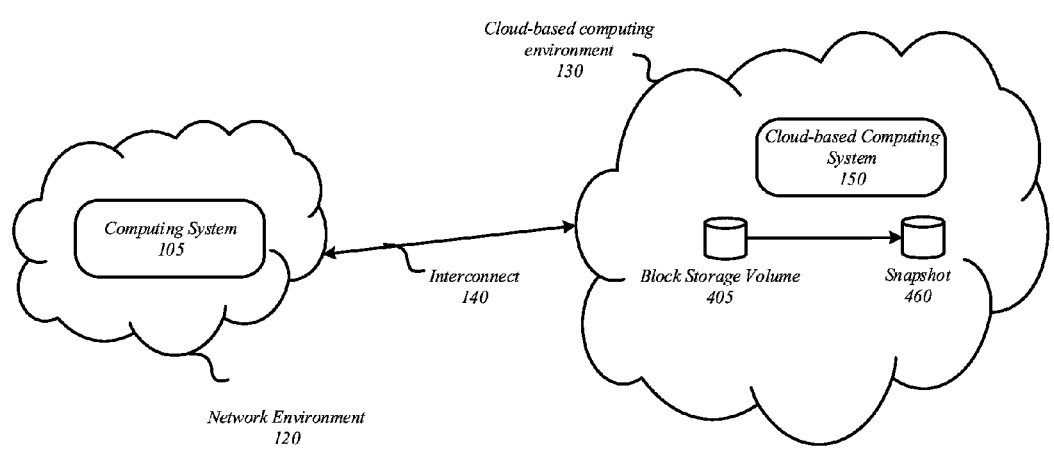
Figure 4D:
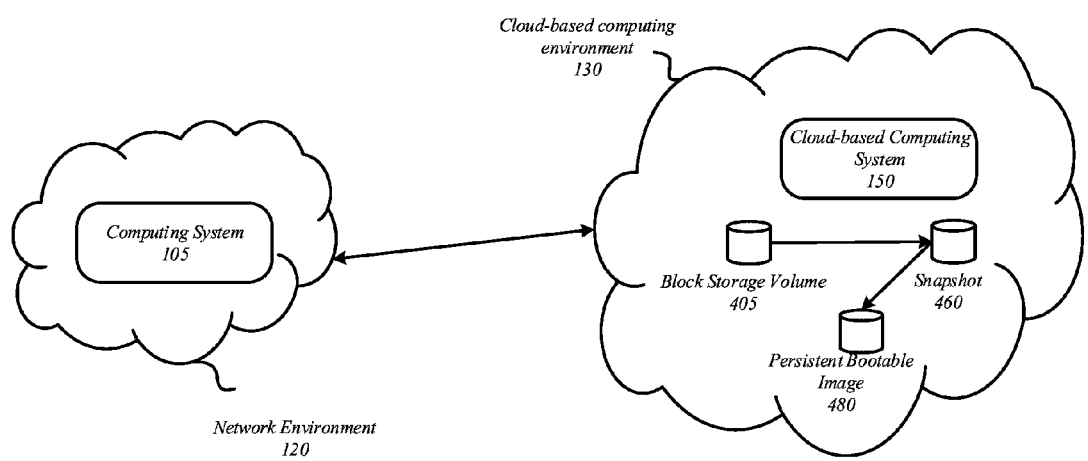

In various embodiments, the block storage volume 405 may be detached from the update service component 350 once the file system is created on the volume 405, the software is installed, and the file system is unmounted on the volume. The update service component 350 may create a snapshot 460 of the volume 405 and all of its contents including the file system and partition information. Further, the update service component 350 may create a bootable image 480 using the snapshot 460 in the cloud-based computing environment 130, as illustrated in FIGS. 4C and 4D. The bootable image 480 may be accessible to a remote computing device, such as a device, node, etc. of computing system 105.

The snapshot 460 may be a copy of the block storage volume 405 at the time the snapshot 460 is taken and/or may be used to create the bootable image 480. The snapshot 460 may contain all of the information needed to create bootable image 480. In various embodiments, the bootable image 480 may be an Amazon® Machine Image (AMI), for example, and can provide information to launch an instance of a virtual environment on the cloud-based computing system 150.

Figure 5A:
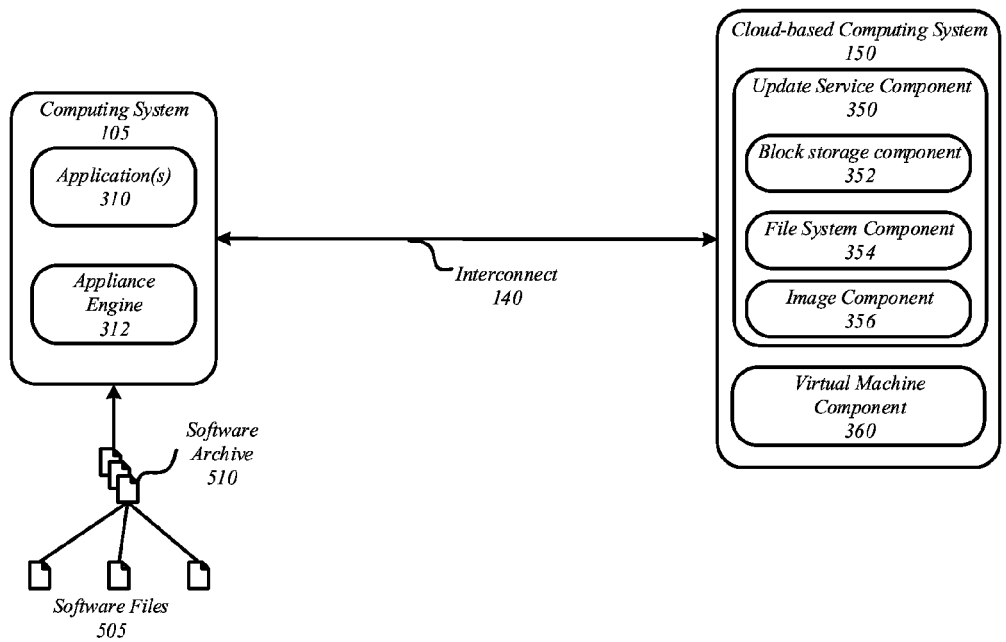
FIGS. 5A and -5B illustrate exemplary embodiments of a system for software installation on a block storage volume.
Figure 5B:
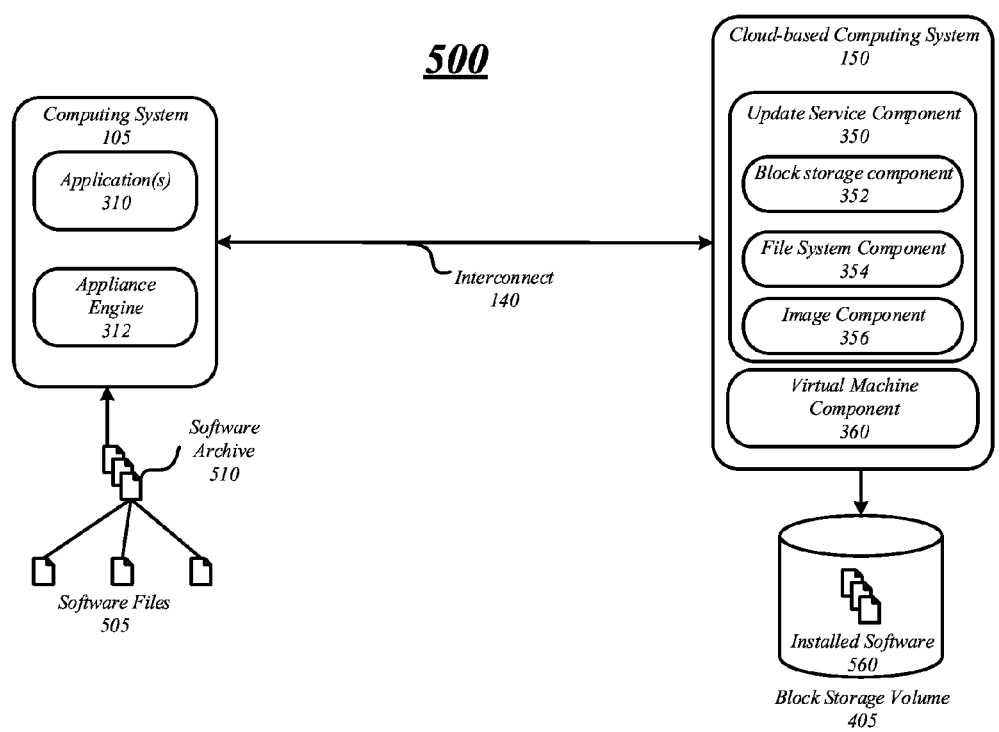

FIGS. 5A and 5B illustrate exemplary embodiments of a system 500 while processing system archives and creates a bootable image. In various embodiments, system 500 includes computing system 105 and cloud-based computing system 150 as described above with respect to FIGS. 1-4D. As previously discussed, the computing system 105 may include an appliance engine 312 capable of initiating the creation of a bootable image on a cloud-based computing system 150 using software files 505 from a repository or storage location, such as storage system 160. The software files 505, may be any files to create a bootable image on the cloud-based computing system 150, and when loaded may provide a virtual environment that a user of the computing system 105 may interface with on the cloud-based computing environment 130. For example, the software files 505 may include operating system files to provide an operating system environment, application files to provide application services that may be executable, configuration files to configure the environment, database files to generate and provide a database environment, and so forth. Various embodiments are not limited in this manner and the software files 505 may include any files, instructions, information and so forth required to create a virtual environment using a bootable image on the cloud-based computing environment 130.

FIG. 5A illustrates the appliance engine 312 retrieving the software files 505 and creating a software archive 510. The software archive 510 may be a package or grouping of the software files 505 in a structure such as a folder, a file, a linked list, and so forth. In some embodiments, the appliance engine 312 may collect the software files 505 and create an archive file, such as a zip file, a Roshal Archive (RAR) file, an International Organization for Standardization (ISO) file, a tape archive (TAR) file, and so forth, to generate the software archive 510. The software files 505 may also be compressed using any data compression technique and/or encrypted to secure the information in the software files 505 for communication between systems.

The appliance engine 312 may create the software archive 510 and send it to the cloud-based computing system 150 for installation on a block storage volume. Alternatively, the appliance engine 312 may create the software archive 510 and store it in memory or local storage for the cloud-based computing system 150 to retrieve from the computing system 105. For example, the update service component 350 may receive the request to generate the bootable image from the appliance engine 312 and may create a block storage volume 405, as illustrated in FIG. 5B. The software archive 510 may be retrieved by the updated service component 350 and installed on the block storage volume 405 as installed software 560.

In some embodiments, the update service component 350 may retrieve the software archive 510 and the file system component 354 may perform one or more operations on the software archive 510, such as a decryption operation, a unarchive operation, a decompression operation and so forth based on, for example, whether the software archive 510 has been archived, encrypted, and/or compressed by the appliance engine 312. In some embodiments, the file system component 354 may perform the one or more operations on the software archive 510 to obtain the software files 505 in original form for installation on the block storage volume 405. The original software files 505 may be installed in one or more partitions on the block storage volume and result in installed software 560. Once the installed software 560 is on the block storage volume 405 the bootable image may be created as previously discussed above with respect to FIGS. 3 and 4A-4D.

Figure 6A:
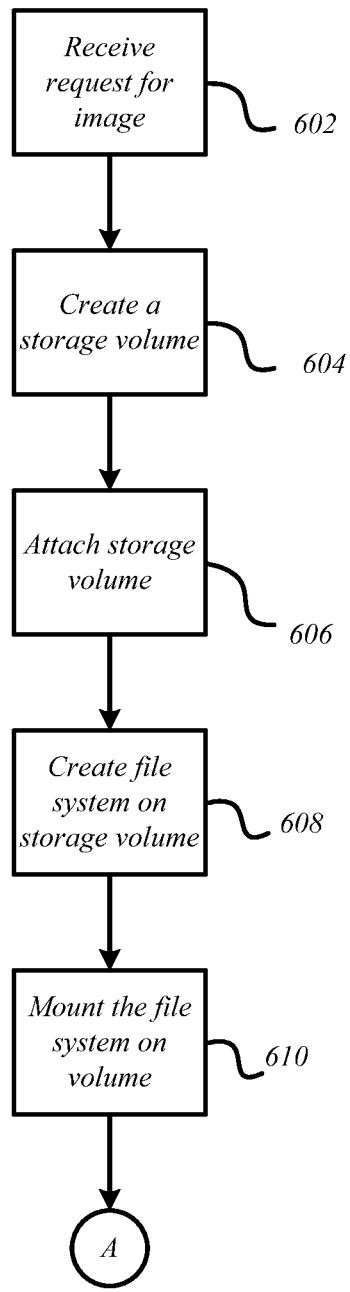
FIG. 6A/B illustrates an exemplary embodiment of a logical flow diagram for creating a bootable image.
Figure 6B:
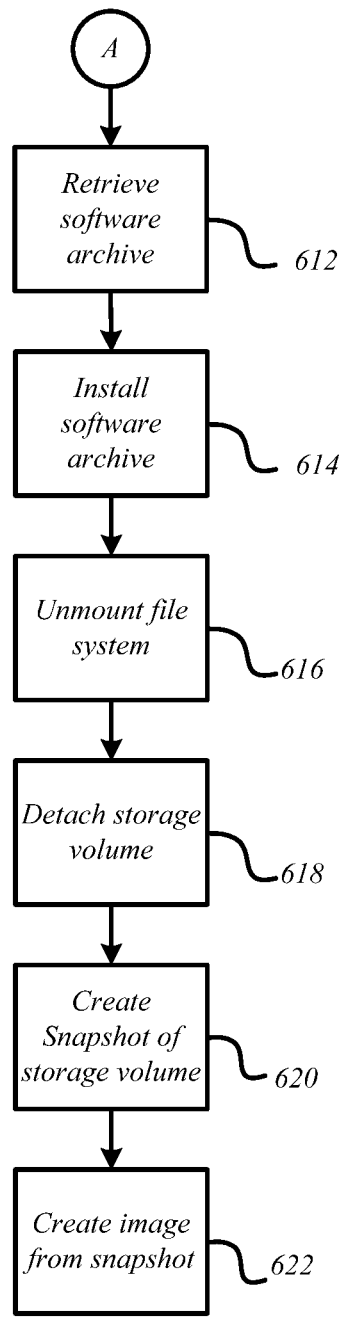

FIG. 6A/B illustrates an exemplary embodiment of logic flow 600 for creating a bootable image on a cloud-based computing system. Logic flow 600 is discussed with reference to system 300 of FIG. 3 for illustrative purposes. Various embodiments are not limited in this manner, and the logic flow 600 may be implemented on any computing system or device.

At block 602, the logic flow 600 may include receiving a request for a bootable image to be created on a cloud-based computing system. For example, an update service component 350 may receive a request from an appliance engine 312 to create a bootable image on the cloud-based computing system 150 for use by computing system 105 or any other device permitted to access cloud-based computing environment 130. The request may be have been generated in response to, for example, a user selection to create the bootable image or based on a determination made by the appliance engine 312. In some embodiments, the appliance engine 312 may include logic to determine whether a system, such as computing system 105 requires additional services and may be better suited if the services were offloaded to a cloud-based computing system. The appliance engine 312 can generate the request to create the bootable image based on the determination.

In some embodiments, the request may include information to create the bootable image, such as a size of a block storage volume to create the image, information for how many partitions to install on the volume, information for a file system to install on the volume, instructions to make the image bootable, and so forth. The update service component 350 may receive the request and a block storage volume may be created in storage at block 604. More specifically, a block storage component 352 may process the request and generate a block storage volume based on the request and in accordance to the information provided in the request. If the request fails to provide information to configure the block storage volume, the block storage component 352 may use a default setting to configure the block storage volume.

The block storage volume may be created and attached to the update service component 350 by the block storage component 352 at block 606. The block storage volume may be attached to the update service component 350 so it may configure and install software on the volume. More specifically, the file system component 354 may create a file system on the block storage volume at block 608 and mount the file system to the volume at block 610. The file system component 354 may create a file system on the block storage volume as defined in the request or may use a default file system such as the third extended file system (EXT3). Various embodiments are not limited in this manner.

At block 612, a software archive may be retrieved from the computing system 105 for installation on the block storage volume. More specifically, the update service component 350 may retrieve the software archive from the appliance engine 312 and may install the software archive in the file system on the block storage volume by the file system component 354 at block 614. In some embodiments, one or more operations may be performed on the software archive before it is installed, such as a decompression operation, an unarchive operation, and/or a decryption operation. The software archive may contain any number of software files for installation on the block storage volume.

The file system component 354 may unmount the file system from the volume at block 616 and detach the block storage volume from the update service component 350 at block 618. Further, a snapshot of the block storage volume may be created at block 620. More specifically, the image component 356 may create a snapshot of the file system including the software in the cloud-based computing environment. The snapshot may be a copy of the block storage volume at the time the snapshot is taken and may be used to create the bootable image. In various embodiments, the bootable image may be created from the snapshot at block 622. The bootable image may be accessible to any remote computing device, such as a device, node, etc. of computing system 105 or any other computing system and may be used to create a virtual environment a cloud-based computing environment.

FIG. 7 illustrates an exemplary embodiment of logic flow 700. The logic flow 700 may be representative of some or all of the operations executed by one or more embodiments described herein. For example, the logic flow 700 may illustrate operations performed by the systems of FIGS. 1-6B, 9 and 10.

In the illustrated embodiment shown in FIG. 7, the logic flow 700 may include receiving a request from a remote computing device to generate a bootable image in a cloud-based computing environment at block 705. For example, a cloud-based computing system may receive a request to generate the bootable image from a computing system, and in particular, one or more nodes, devices, components and so forth of the computing system.

In some embodiments, the cloud-based computing environment may be in a particular region of locality determined by a user of a computing system or by one or more processes on the computing system itself. For example, a user or computing system may decide to use services such as processing, storage, and so forth offered by a cloud-based computing environment, and may choose a region including the cloud-based computing environment to send the request, which may be the closest region to the computing system. However, some embodiments are not limited in this manner and the region may be determined based on the services and/or performances offered by the cloud-based computing environment in a particular region.

In some embodiments, the request may include information to create the bootable image, such as a size of a block storage volume to create the image, information for how many partitions to install on the volume, information for a file system to install on the volume, instructions to make the image bootable, and so forth. Further, the logic flow 700 at block 710 may include creating a block storage volume in the cloud-based computing environment in response to receiving the request, the block storage volume having one or more partitions. The block storage volume may be created on one or more storage units or devices in the cloud-based computing environment and may be coupled with a cloud-based computing system. In some embodiments, the block storage volume may be an elastic block storage volume (EBS) provided by Amazon's Elastic Compute Cloud® (EC2), for example. However, various embodiments are not limited in this manner and the block storage volume may be any storage volume offered in a cloud-based computing environment.

In various embodiments, the block storage volume may be any size, such as 1 Gigabyte (GB), 100 GB, 500 GB, 1 Terabyte (TB), and so forth, for example. In some embodiments, the size of the block storage volume may be limited to a specific size, such as 1 TB, for example. However, various embodiments are not limited in this manner. Further, the size of the block storage volume may be based on default configuration settings, information received in the request to create the image and so forth.

Once created, the block storage volume may then be used like a raw block device. For example, the block storage volume may be divided into any number of partitions and formatted with one or more file systems based on default configuration settings, information received in the request, and so forth. Moreover, the logic flow 700 at block 715 may also include installing software comprising one or more files in a file system on the block storage volume in the cloud-based computing environment, the software retrieved remotely as a software archive. In some embodiments, the one or more files may include operating system files to provide an operating system environment, application files to provide application services that may be executable, configuration files to configure the environment, database files to generate and provide a database environment, and so forth.

In various embodiments, the logic flow 700 may include creating a snapshot of the file system including the software in the cloud-based computing environment at block 720. The snapshot may be a copy of the block storage volume including the software installed on the volume in the file system. In various embodiments, at block 725, the logic flow 700 may include creating the bootable image from the snapshot of the file system in the cloud-based computing environment 130.

The bootable image may be used by a remote computing system to create a virtual environment operating with using an interface, such as a web browser. The bootable image may be kept in a persistent manner on a cloud-based computing system and may be loaded, unloaded, reloaded any number of times. Further, the bootable image may be used by any computing system, including the originating computing system, to create multiple simultaneous instances of the virtual environment on the cloud-based computing system. Various embodiments are not limited in this manner.

Figure 8:
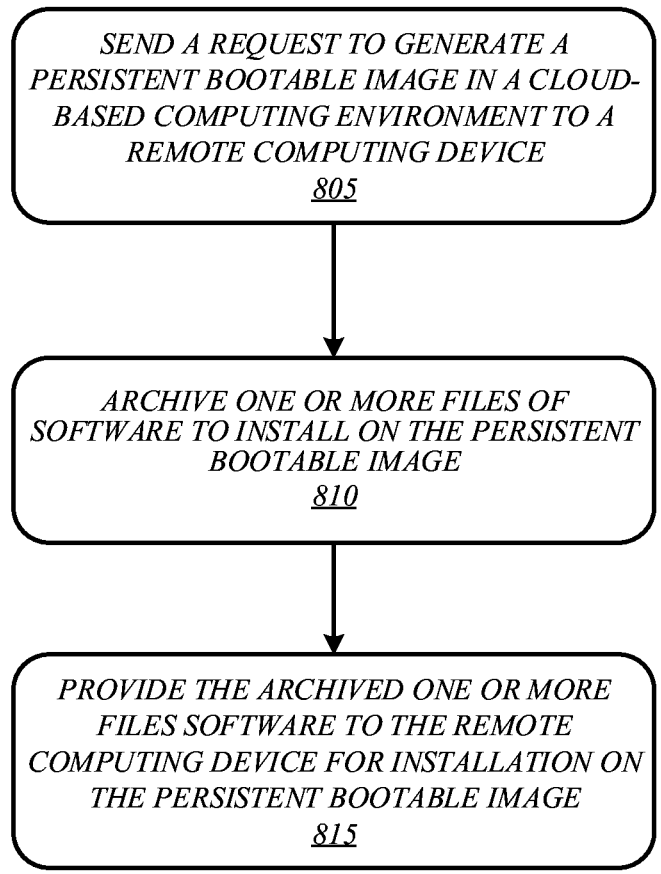
FIG. 8 illustrates an exemplary embodiment of a third logic flow diagram.

FIG. 8 illustrates an exemplary embodiment of logic flow 800. The logic flow 800 may be representative of some or all of the operations executed by one or more embodiments described herein. For example, the logic flow 800 may illustrate operations performed by the systems of FIGS. 1-6B, 9 and 10.

At block 805, the logic flow 800 may include sending a request to generate a bootable image in a cloud-based computing environment to a remote computing device. In various embodiments, the remote computing device may be a node, a device and so forth of cloud-based computing system. Further and as previously discussed, the request may include information to create the bootable image, such as a size of a block storage volume, information for how many partitions to install on the volume, information for a file system to install on the volume, instructions to make the image bootable, and so forth.

In various embodiments, the logic flow 800 may include archiving one or more files of software to install on the bootable image at block 810. The one or more files may include operating system files to provide an operating system environment, application files to provide application services that may be executable, configuration files to configure the environment, database files to generate and provide a database environment on a cloud-based computing system, and so forth. Further, the software archive may be compressed and/or encrypted for communication to the remote computing device.

Logic flow 800 may include providing the software archive to the remote computing device for installation on the bootable image at block 815. In some embodiments, the software archive may be sent to the remote computing device or the remote computing device may retrieve the archive.

Figure 9:
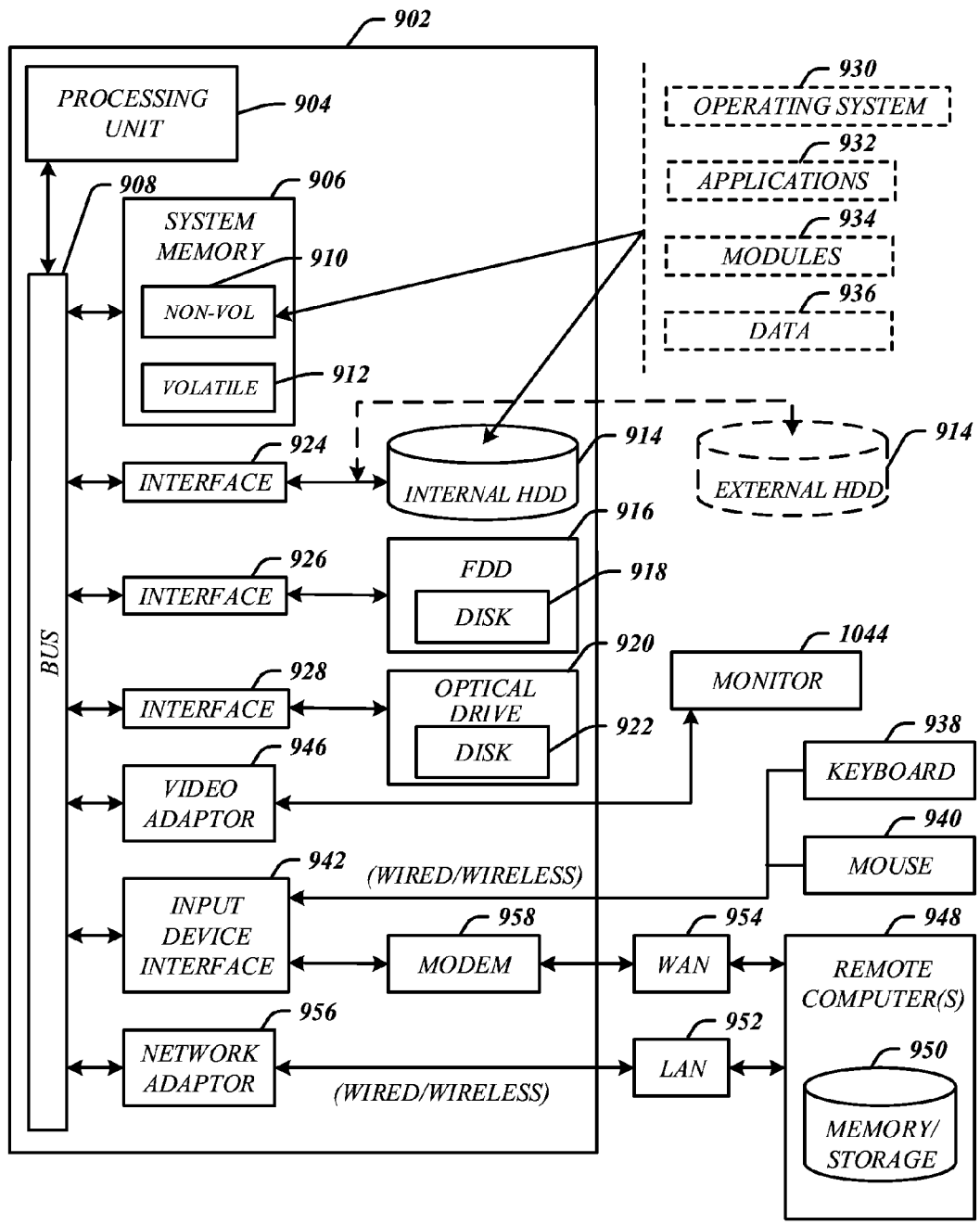
FIG. 9 illustrates an exemplary embodiment of a first computing architecture.

FIG. 9 illustrates an embodiment of an exemplary computing architecture 900 suitable for implementing various embodiments as previously described. In one embodiment, the computing architecture 900 may comprise or be implemented as part of computing systems of FIGS. 1-3, 4A-4D, 5A and 5B.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Processing unit 904 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing unit 904 may be connected to and communicate with the other elements of the computing system via an interconnect. Further, processing unit 904 may include other components, such as an uncore component including logic to process information, instructions, and so forth not essential to core processing.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 628, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives, non-volatile memory 910, and volatile memory 912, including an operating system 930, one or more application programs 932, other program modules 934, and program data 936. In one embodiment, the one or more application programs 932, other program modules 934, and program data 936 can include, for example, the various applications and/or components of the device 102 and device 205.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3 G, 4 G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

The various elements of the computer systems as previously described with reference to FIGS. 1-5 may involve various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. At least one non-transitory computer-readable storage medium comprising instructions that, when executed, cause a system to:
receive a request from a remote computing device to generate a bootable image in a cloud-based computing environment;
create a block storage volume in the cloud-based computing environment in response to the request to generate the bootable image, the block storage volume having one or more partitions;
attach the block storage volume to an update service component in the cloud-based computing environment to create a file system and install software on the block storage volume;
install the software comprising one or more files in the file system on the block storage volume in the cloud-based computing environment;
detach the block storage volume from the update service component prior to creating a snapshot of the file system;
create the snapshot of the file system including the software in the cloud-based computing environment; and
create the bootable image from the snapshot of the file system in the cloud-based computing environment.

2. The non-transitory computer-readable storage medium of claim 1, comprising instructions that when executed cause the system to create the file system in at least one of the one or more partitions on the block storage volume.

3. The non-transitory computer-readable storage medium of claim 1, comprising instructions that when executed cause the system to retrieve a software archive including the software from the remote computing device via a network interface.

4. The non-transitory computer-readable storage medium of claim 1, wherein the software archive is compressed and the medium comprising instructions that when executed cause the system to decompress the software archive to install the software on the file system.

5. The non-transitory computer-readable storage medium of claim 1, wherein the bootable image being accessible to one or more remote computing devices via one or more network connections.

6. The non-transitory computer-readable storage medium of claim 1, comprising instructions that when executed cause the system to utilize the block storage volume as a raw block device to divide the block storage volume into the one or more partitions.

7. The non-transitory computer-readable storage medium of claim 1, comprising instructions that when executed cause the system to divide the block storage volume into the one or more partitions based on default configuration settings or information received in the request.

8. A computer-implemented method, comprising
receiving, by circuitry, a request to generate a bootable image in a cloud-based computing environment;
creating a block storage volume in the cloud-based computing environment in response to receiving the request, the block storage volume having one or more partitions;
attaching the block, storage volume to an update service component in the cloud-based computing environment to create a file system and install software on the block storage volume;
installing the software comprising one or more files in the file system on the block storage volume in the cloud-based computing environment;
detaching the block storage volume from the update service component prior to creating a snapshot of the file system;
creating the snapshot of the file system including the software in the cloud-based computing environment; and
creating a bootable image from the snapshot of the file system in the cloud-based computing environment.

9. The computer-implemented method of claim 8, comprising:
creating the file system in at least one of the one or more partitions on the block storage volume.

10. The computer-implemented method of claim 8, comprising:
retrieving a software archive including the software from the remote computing device via a network interface.

11. The computer-implemented method of claim 8, wherein the software archive is compressed and the method comprises decompressing the software archive to install the software on the file system.

12. The computer-implemented method of claim 8, wherein the bootable image being accessible to one or more remote computing devices via one or more network connections.

13. The computer-implemented method of claim 8, comprising utilizing the block storage volume as a raw block device to divide the block storage volume into the one or more partitions.

14. The computer-implemented method of claim 8, comprising dividing, the block storage volume into the one or more partitions based on default configuration settings or information received in the request.

15. An apparatus, comprising:
processing circuitry;
memory storing instructions operable on the processing circuitry, the instructions, when executed, cause the processing circuitry to:
receive a request to generate a bootable image in a cloud-based computing environment from a remote computing device;

create a block storage volume in the cloud-based computing environment in response to receiving the request, the block storage volume having one or more partitions;
attach the block storage volume to an update service component in the cloud-based computing environment to create a file system and install software on the block storage volume;
install the software comprising one or more files in the file system on the block storage volume in the cloud-based computing environment;
detach the block storage volume from the update service component prior to creating a snapshot of the file system;
create the snapshot of the file system including the software in the cloud -based computing environment; and
create the bootable image based on the snapshot of the file system in the cloud -based computing environment.

16. The apparatus of claim 15, the processing circuitry to create the file system in at least one of the one or more partitions on the block storage volume.

17. The apparatus of claim 15, comprising:
a network interlace coupled with the processing circuitry; and
the processing circuitry to retrieve a software archive including the software from the remote computing device via the network interface.

18. The apparatus of claim 15, wherein the software archive is compressed and the processing circuitry to decompress the software archive to install the software on the file system.

19. The apparatus of claim 15, wherein the bootable image being accessible to one or more remote computing devices via one or more network connections.

20. The apparatus of claim 15, the processing circuitry to utilize the block storage volume as a raw block device to divide the block storage volume into the one or more partitions.

21. The apparatus of claim 15, the processing circuitry to divide the block storage volume into the one or more partitions based on default configuration settings or information received in the request.

* * * * *